United States Patent [19]

Miner et al.

[11] Patent Number: 5,901,616
[45] Date of Patent: May 11, 1999

[54] INERTIAL MASS FOR VIBRATION ISOLATORS

[75] Inventors: Frederick J. Miner, Barkhamsted; David N. Schmaling, Southbury; Kenneth J. Buckman, New Haven, all of Conn.

[73] Assignee: Sikorsky Aircraft Corporation, Stratford, Conn.

[21] Appl. No.: 08/929,498

[22] Filed: Sep. 15, 1997

[51] Int. Cl.⁶ ................................................. F16F 15/121
[52] U.S. Cl. .......................... 74/574; 74/573 R; 416/145; 416/500
[58] Field of Search ..................... 74/574, 572, 573 R; 416/144, 145, 500; 464/100, 51, 180

[56] References Cited

U.S. PATENT DOCUMENTS

| | | | |
|---|---|---|---|
| 1,803,937 | 5/1931 | Jansson | 74/574 X |
| 2,473,335 | 6/1949 | Hardy | 74/574 |
| 3,540,809 | 11/1970 | Paul et al. | 416/1 |
| 3,603,172 | 9/1971 | Hall | 74/574 |
| 4,046,230 | 9/1977 | Troyer | 74/574 X |
| 4,057,363 | 11/1977 | Kenigsberg et al. | 416/145 |
| 4,083,654 | 4/1978 | Kenigsberg et al. | 416/145 |
| 4,145,936 | 3/1979 | Vincent et al. | 74/574 |
| 4,225,287 | 9/1980 | Vincent et al. | 416/145 |
| 4,596,513 | 6/1986 | Carlson et al. | 416/145 |
| 5,647,726 | 7/1997 | Sehgal et al. | 416/145 |

Primary Examiner—John A. Jeffery
Assistant Examiner—Mary Ann Battista
Attorney, Agent, or Firm—Brian A. Collins

[57] ABSTRACT

An inertial mass (50) for a vibration isolator (20) having an attachment fitting (22) adapted for rotation about an axis (16) and a spring (40) adapted for rotation with the attachment fitting (22). The inertial mass (50) is characterized by a pair of segments (52) each having a generally Z-shaped cross-sectional configuration. More specifically, each segment (52) defines a central web (54), a first leg (56) projecting radially inboard of the central web (54) and a second leg (58) projected radially outboard of the central web (54). The first and second legs (56, 58) are integral with the central web (54) and the second legs (58) are adjoined along a mating interface (I) to define the assembled inertial mass (50). As assembled, the inertial mass (50) is adapted for being mounted in combination with the spring (40) of the vibration isolator (20). Preferably, the second legs (58), in combination, define a mating flange (62) which is adapted for mounting at least one tuning weight (64), and, the first legs (56) define circular abutment surfaces (68) adapted for coacting with an opposing abutment surface (70) of the attachment fitting (22).

18 Claims, 6 Drawing Sheets

INERTIAL MASS FOR VIBRATION ISOLATORS

TECHNICAL FIELD

This invention is directed to vibration isolators, and, more particularly, to an improved inertial mass therefor, and more particularly, to an improved inertial mass for use in combination with a helicopter mast-mounted vibration isolator.

BACKGROUND OF THE INVENTION

Mast-mounted vibration isolators are well-known in the art for canceling or substantially reducing vibratory forces active on a helicopter rotor. While most such devices are referred to as "vibration absorbers", this may be viewed as a misnomer inasmuch as these devices typically isolate the energy produced by cyclic in-plane and out-of-plane loads rather than absorb the energy as the name implies. Such devices typically comprise: a hub attachment fitting for mounting to the main rotor hub such that the isolator is rotated in a plane parallel to the main rotor disc, and a spring-mass system mounted to and rotating with the hub member. The spring-mass system is tuned in the non-rotating condition to a frequency equal to N * rotor RPM (e.g., 4P for a four-bladed rotor) at normal operating speed, so that in the rotating condition it will respond to both N+1 and N−1 frequency vibrations (i.e., 3P and 5P).

FIGS. 1a and 1b depict a prior art vibration isolator similar to those described and illustrated in Vincent el al. U.S. Pat. Nos. 4,145,936 and 4,225,287. As shown, the mast-mounted vibration isolator 100 includes a plurality of resilient arms (i.e., springs) 102 extending in a spaced-apart spiral pattern between a hub attachment fitting 104 and a ring-shaped inertial mass 106. More specifically, the hub attachment fitting 104 includes a stanchion 108 mounting to and rotating with a helicopter main rotor hub 110 and a mounting adapter 112 which is supported and driven by the hub-mounted stanchion 108. Several pairs of spiral springs 102 (i.e., four upper springs 102a and four lower springs 102b) are mounted to and equiangularly arranged with respect to both the hub attachment fitting 104 and the inertial mass 106 so as to produce substantially symmetric spring stiffness in an in-plane direction. Each spring 102 is comprised of unidirectional fiberglass so as to provide low in-plane bending stiffness and superior fatigue properties.

In Fig. 1b, the inertial mass 106 is comprised of three segments which include a central ring 106c and a pair of ring-shaped plates 106a, 106b mounted in combination therewith so as to produce a substantially C-shaped cross-section. As such, the C-shaped configuration provides the requisite stiffness to obviate distortion and the adverse consequences of higher harmonic dynamic resonances. Furthermore, each of the ring-shaped plates 106a, 106b define a circular abutment surface 120 which is aligned with a plurality of elastomer pads 122 which are bonded to the hub attachment fitting 104. As such, the ring-shaped plates 106a, 106b coact with one or more of the elastomer pads 122 to limit the in-plane motion of the inertial mass 106 and delimit the maximum stresses acting on the spiral springs 102.

To provide the necessary structural rigidity and properly react the motion limiting loads, the inertial mass 106 also includes a piloting arrangement 124 (see detail FIG. 1c) wherein a circular shoulder 126 is formed in each of the ring-shaped plates 106a, 106b and disposed in abutting combination a mating surface 128 of the central ring 106c. As such, radial loads are directly transferred from the shoulder 126 to the central ring 106c without imposing shear loads on the connecting fasteners 130. Finally, the upper and lower surfaces $106a_s$, $106b_s$ of the ring-shaped plates 106a, 106b provide a convenient mounting location for tuning weights 134 which may be added or deleted to optimally tune the vibration isolator 100.

While the teachings disclosed in the '936 and '287 patents provide a baseline for design and development, the vibration isolator described therein, and particularly, the configuration of the inertial mass 106, is disadvantageous for various reasons. Firstly, the piloting arrangement 124 requires highly precise and costly machining of each segment of the inertial mass 106 (i.e., the shoulders 126 of the ring-shaped plates 106a, 106b and the complementary mating surfaces 128 of the central ring 106c). Secondly, it will be appreciated that the connecting fasteners 130 and the machining of the respective threaded inserts increases the fabrication costs without providing a significant structural function, i.e., other than to facilitate assembly/disassembly of the vibration isolator 100. Thirdly, the elastomer pads 122 are prone to frequent disbond and repair. Finally, by affixing the tuning weights 134 to the upper and lower surfaces $106a_s$, $106b_s$ of the ring-shaped plates 106a, 106b, the height dimension of the vibration isolator 100 is increased, thereby increasing the profile area for producing aerodynamic drag.

A need, therefore, exists for an inertial mass for a vibration isolator which, inter alia, facilitates assembly/disassembly, provides improved structural efficiency, reduces fabrication costs, and ameliorates the aerodynamic drag characteristics of the vibration isolator.

SUMMARY OF THE INVENTION

It is an object of the present invention to provide an inertial mass for a vibration isolator which is configured for optimal structural efficiency.

It is another object of the present invention to provide such an inertial mass which reduces fabrication costs.

It is yet another object of the present invention to provide such an inertial mass which facilitates assembly/disassembly of the vibration isolator.

It is still a further object of the invention to provide such an inertial mass which reduces the profile area of the vibration isolator for minimizing aerodynamic drag.

These and other objects are achieved by an inertial mass for a vibration isolator having an attachment fitting adapted for rotation about an axis and a spring means adapted for rotation with the attachment fitting. The inertial mass is characterized by a pair of segments each having a generally Z-shaped cross-sectional configuration. More specifically, each segment defines a central web, a first leg projecting radially inboard of the central web and a second leg projected radially outboard of the central web. The first and second legs are integral with the central web and the second legs are adjoined along a mating interface to define the assembled inertial mass. As assembled, the inertial mass is adapted for being mounted in combination with the spring means of the vibration isolator. Preferably, the second legs, in combination, define a mating flange which is adapted for mounting at least one tuning weight, and, the first legs define circular abutment surfaces adapted for coacting with an opposing abutment surface of the attachment fitting.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIG. 1b is a cross-sectional view of the prior art vibration isolator taken substantially along line 1b—1b of FIG. 1a;

FIG. 1c is an enlarged view of a pilot arrangement employed in the prior art vibration isolator;

BEST MODE FOR CARRYING OUT THE INVENTION

Figure 2:
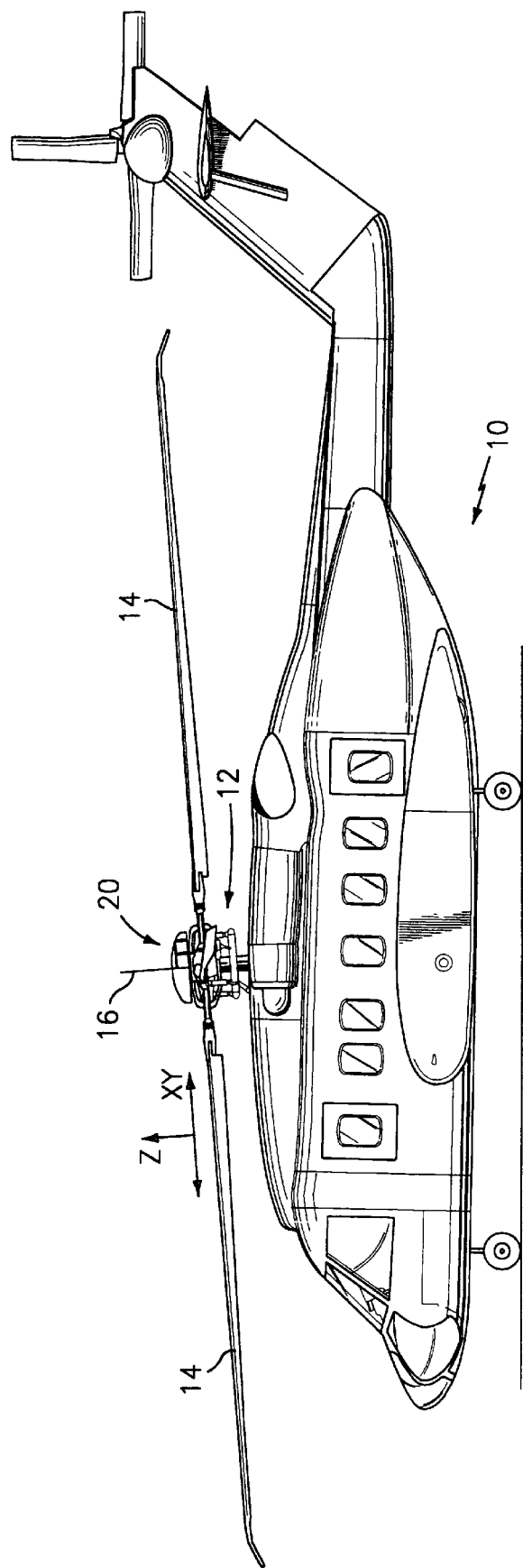
FIG. 2 is a profile view of a rotorcraft illustrating an exemplary installation of a vibration isolator which incorporates an inertial mass according to the present invention.

Referring now to the drawings wherein like reference characters identify corresponding or similar elements throughout the several views, FIG. 2 shows a helicopter 10 having a main rotor 12 for driving a plurality of rotor blades 14 about an axis of rotation 16, and a vibration isolator 20 mounting in combination with the main rotor 12. The vibration isolator 20 is operative to cancel or substantially reduce in-plane vibrations active on the main rotor 12, i.e., along the X-Y plane of the reference coordinate system, and is tuned to a frequency corresponding to N * $RPM_{ROTOR}$ where N is the number of rotor blades 14, and where $RPM_{ROTOR}$ is the rotational speed of the main rotor 12.

Figure 3:
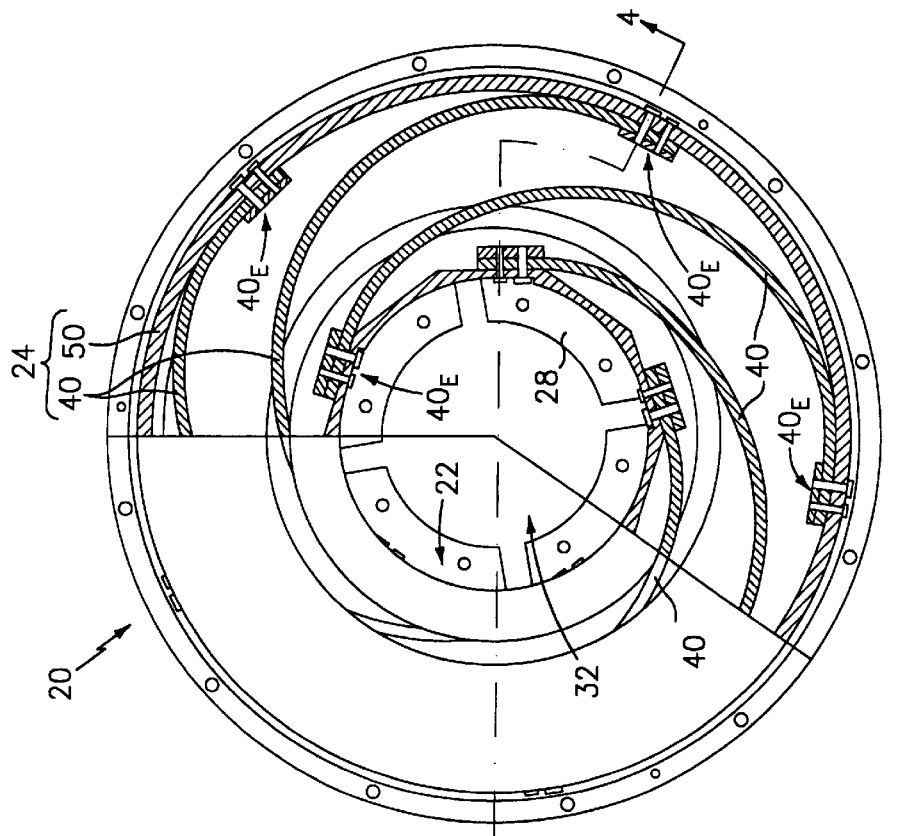
FIG. 3 is a broken-away top view of the vibration isolator.
Figure 1A:
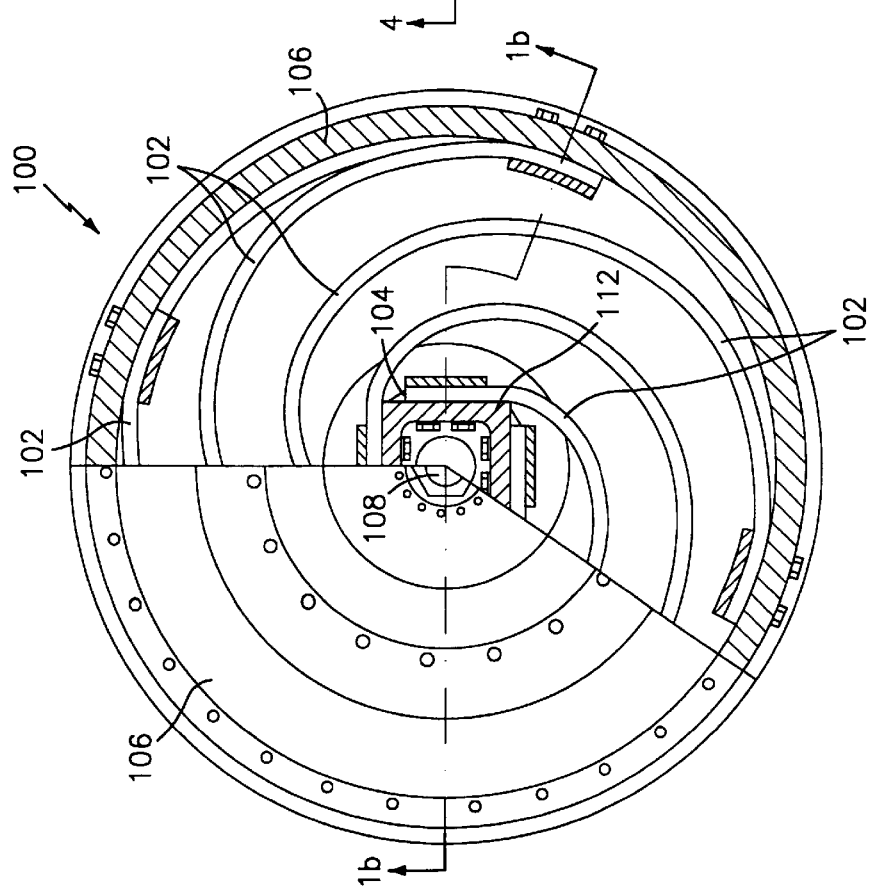
FIG. 1a is a broken-away top view of a prior art vibration isolator.
Figures 1B, 1C:
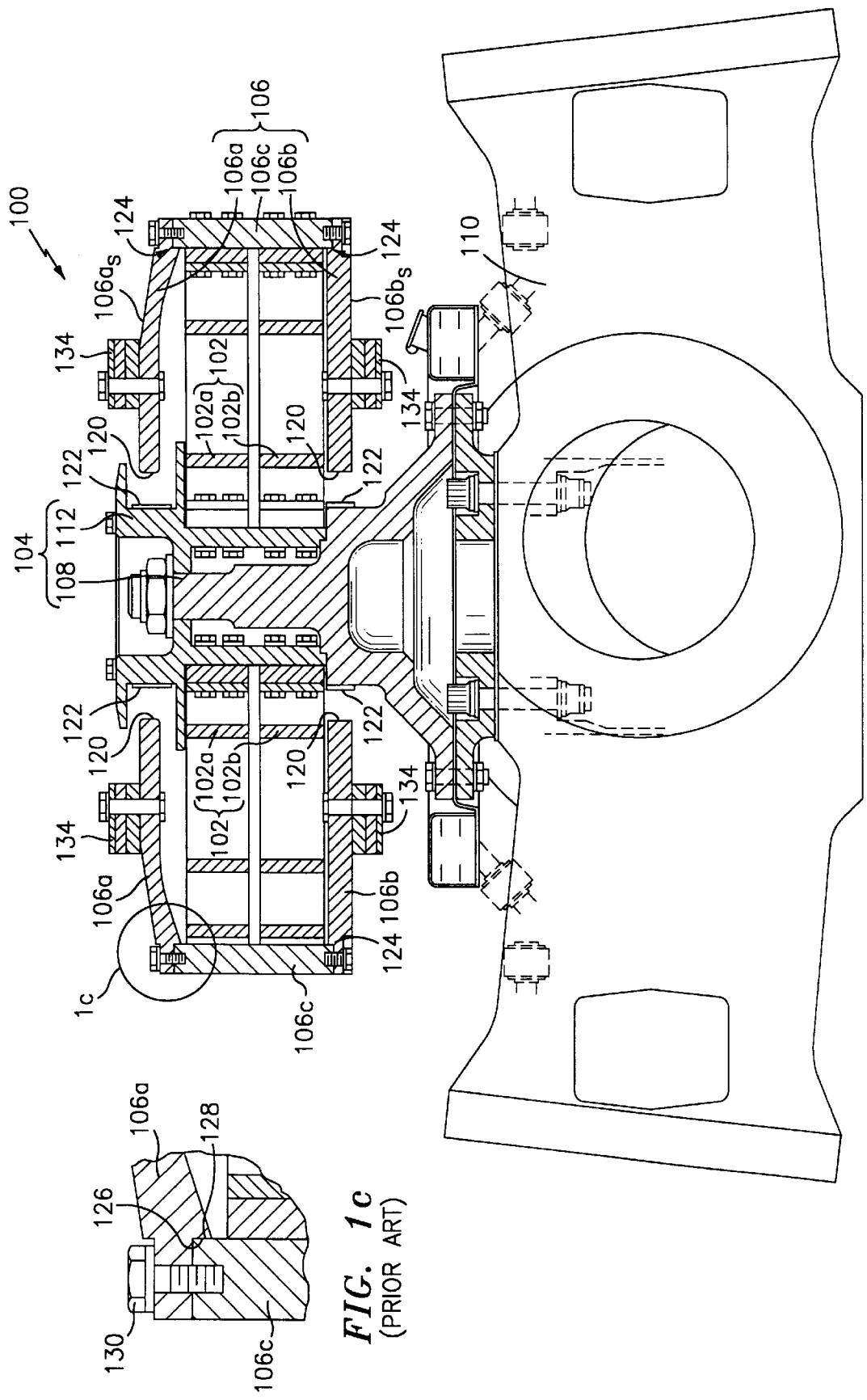
Figure 4:
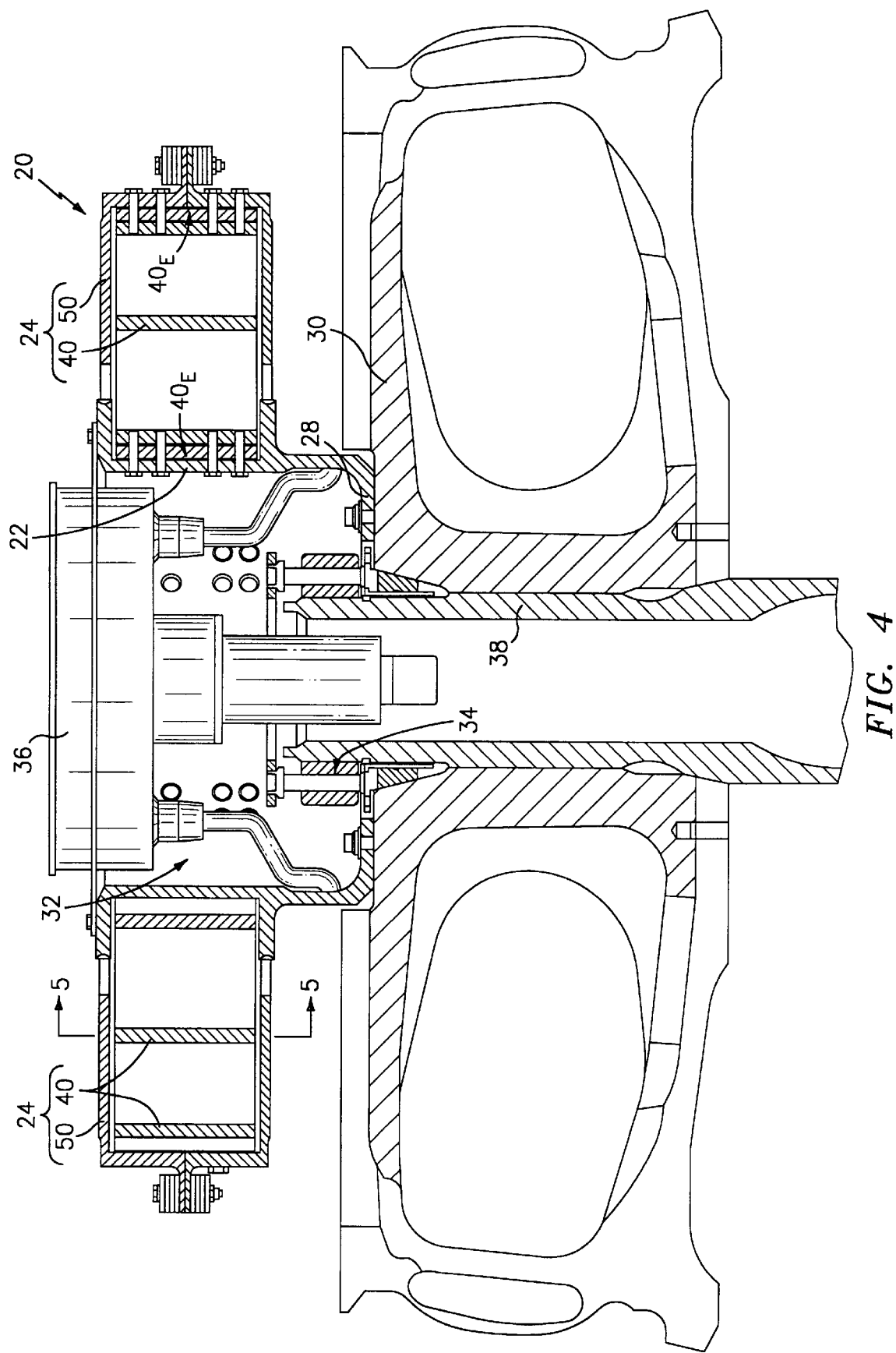
FIG. 4 is a cross-sectional view taken substantially along line 4—4 of FIG. 3.

In FIGS. 3 and 4, the vibration isolator 20 comprises an attachment fitting 22 and a spring-mass system 24 mounting to and rotating with the attachment fitting 22. More specifically, the attachment fitting 22 is generally configured in the shape of a cup or drum and includes an inwardly facing flange 28 for mounting in combination with the main rotor hub 30 (not shown in FIG. 3) of the main rotor. The attachment fitting 22 furthermore defines an internal chamber 32 which accommodates the mounting of a rotor de-ice system 36 (see FIG. 4) and which surrounds a mounting means 34 for coupling the hub retention plate 30 to the main rotor shaft 38.

The spring-mass system 24 is comprised of a plurality of arcuate spring elements 40 and an inertial mass 50 according to the present invention affixed to and supported by the spring elements 40. More specifically, five (5) such spring elements 40 are arranged such that the ends $40_E$ thereof are equiangularly spaced about the attachment fitting 22 and the inertial mass 50, i.e., 72 degrees apart, and span an arc of about 180 degrees. As such, the spring rate stiffness is substantially symmetric in an in-plane direction. In the described embodiment, each spring element 40 is attached by a series of bolts to the attachment fitting 22 and to the inertial mass 50, though it will be appreciated that any suitable attachment means may be employed.

Figure 5:
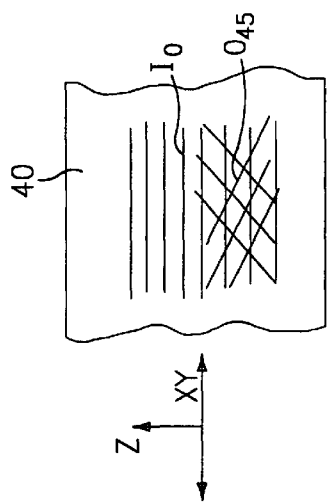
FIG. 5 is a cross-sectional view taken substantially along line 5—5 of FIG. 4.

In the described embodiment, each arcuate spring element 40 is fabricated from composite material having reinforcing fibers disposed in a binding matrix. More specifically, and referring to FIG. 5, each spring element 40 is comprised of about 30–50% in-plane or 0 degree fibers $I_0$, i.e., parallel to the X-Y plane of the reference coordinate system, and 50–70% out-of-plane or ±45 degree fibers $O_{45}$ relative to X-Y plane. In the preferred embodiment, a high modulus fiber such as graphite (e.g., IM-7/8552 produced by Hexcel, located in Stamford, Conn.) is the reinforcing material for each spring element 40. As such, the spring elements 40 are substantially compliant in an in-plane direction and substantially rigid out-of-plane. In the described embodiment, the spring stiffness is selected so as to produce a 4P in-plane frequency, a yaw frequency of about 3.3P, and a vertical and pitch frequency of between about 5.2P and 5.8P. With respect to the latter, such high vertical and pitch stiffness is required to avoid combined dynamic resonances and react gyroscopic loads acting on the vibration isolator 20.

Figure 6:
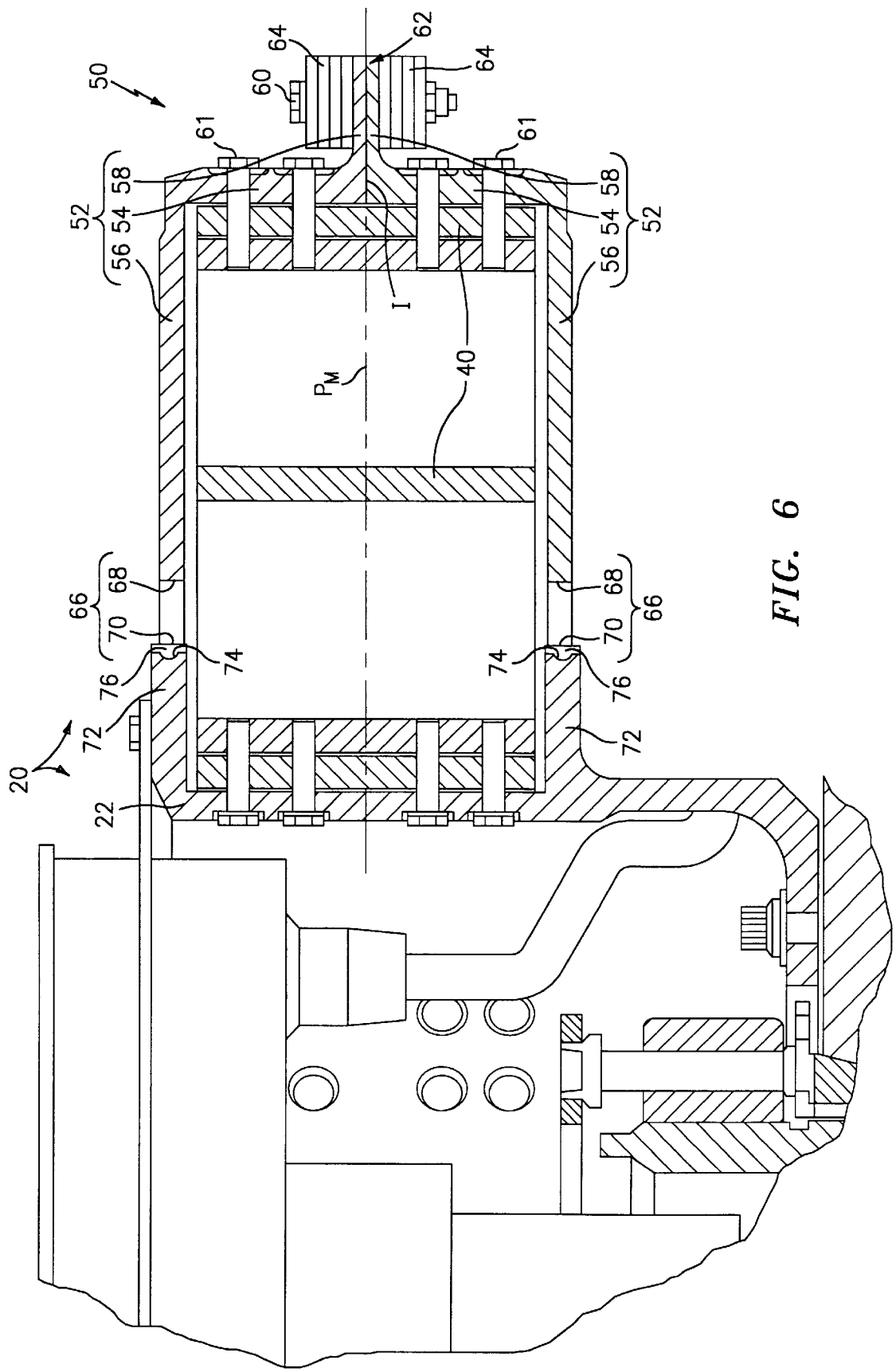
FIG. 6 is an enlarged cross-sectional view of the inertial mass including a pair of Z-shaped segments joined along a mating interface.

In FIG. 6, the inertial mass 50 of the present invention is comprised a pair of segments 52 each having a generally Z-shaped cross-sectional configuration. More specifically, each Z-shaped segment 52 defines a central web 54 adapted for being mounted in combination with the spring elements 40, a first leg 56 projecting radially inboard of the central web 54 and a second leg 58 projecting radially outboard of the central web 54. Furthermore, the legs 56, 58 are integral with the central web 54 and the second legs 58 are adjoined along a mating interface I via connecting bolts 60. While an array of bolts 60 are depicted in the described embodiment, it will be appreciated that any fastening means may be employed to couple the segments 52. As assembled, the central webs 54 are secured in combination with the arcuate spring elements 40 via fasteners 61.

In the preferred embodiment, the second legs 58, in combination, define a mating flange 62 which is adapted for mounting at least one tuning weight 64. As mentioned in the Background of the Invention, such tuning weights 64 may be required to optimally adjust the resonant frequency response of the vibration isolator 20. More preferably, each tuning weight 64 is a continuous ring and two such tuning weights 64 are disposed on opposite sides of the mating flange 62. Most preferably, the second legs 58 are situated such that the mating interface I is coincident with the midplane $P_M$ of the vibration isolator 20. As such, symmetry about the midplane ensures that out-of-plane loads are not developed in the spring elements 40 as a result of force couplings.

In the preferred embodiment, a motion limiting means 66 is provided for delimiting the maximum stresses acting on the arcuate spring elements 40. More specifically, the motion limiting means 66 includes circular abutment surface 68 formed in combination with the first legs 56 of the inertial mass 50 and an opposing abutment surface 70 formed in combination with attachment fitting 22. More specifically, in the preferred embodiment, the attachment fitting 22 includes outwardly extending flanges or segments 72 which are coplanar with the first legs 56 of the Z-shaped segments 52. Furthermore, the flange 72 includes a circular groove 74 for seating an elastomer insert or ring 76 which defines the abutment surface 70. As such, the circular abutment surface 68 coacts with the elastomer ring 76 to limit the permissible in-plane motion of the inertial mass 50, and consequently, delimit the maximum stresses acting on the arcuate spring elements 40. In addition to its function of seating the elastomer ring 76, the circular groove accommodates contact and load vectors having an out-of-plane component thereby reducing the potential for disbond or dislogdement of the elastomer ring 76.

The Z-shaped segments 52 of the inventive inertial mass 50 provide several advantages over the multi-segment configuration of the prior art vibration isolator, i.e., the ring-shaped plates and central ring discussed in the Background of the Invention. Firstly, the impact loads generated upon contact of the motion limiting means 66 are transferred through an integral structure without traversing a joint, or pilot arrangement. Accordingly, the structural integrity of the inertial mass 50 is ameliorated. Secondly, the elimination of joints in the load path reduces fabrication costs by eliminating high tolerance machining operations. That is, the cost of fabricating high tolerance interfaces for efficiently transferring loads is no longer required. Thirdly, the configuration of the inertial mass 50 requires only a single array of connecting bolts 60 about the mating flange 62 to assemble/disassemble the vibration isolator 20, i.e., in contrast to upper and lower fastener arrays of the prior art. Moreover, these same connecting bolts 60 are used for affixing the tuning weights 64. Consequently, the present invention eliminates the cost and weight of three (3) bolt/fastener arrays of the prior art isolator, i.e., two (2) arrays associated with fastening the tuning weights and one (1) array associated with connecting the segments of the inertial mass. Finally, the location of the tuning weights 62 reduces aerodynamic drag. That is, by situating the tuning weights at the mid-plane of the vibration isolator 20, the profile area thereof is reduced for minimizing aerodynamic drag.

Figure 7:
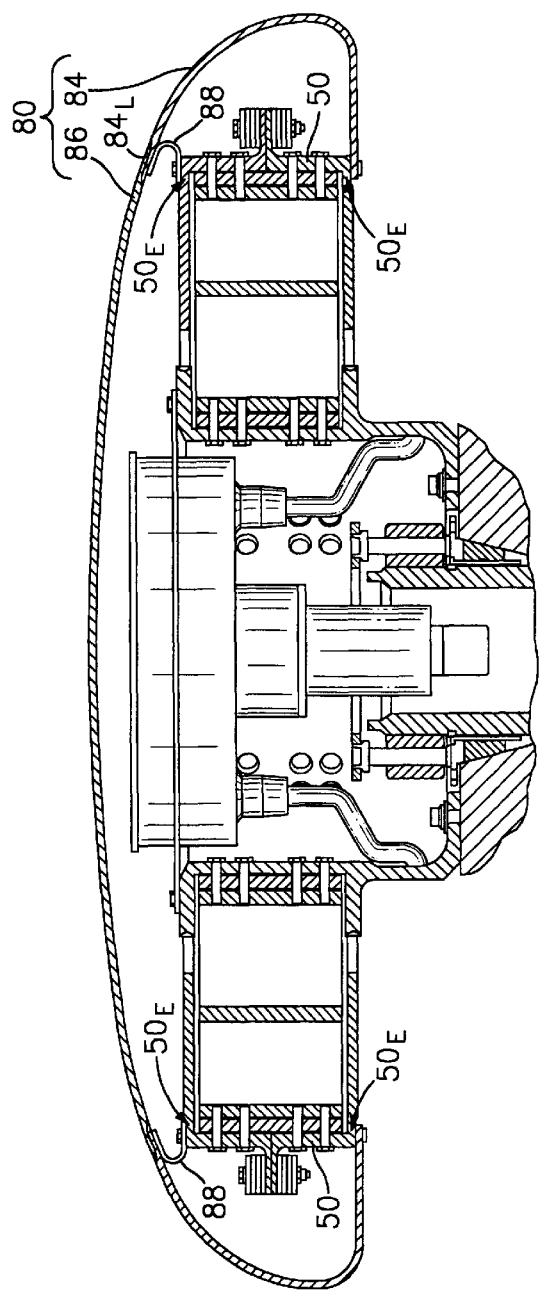
FIG. 7 depicts an alternate embodiment of the vibration isolator including an aerodynamic fairing mounted in combination with the inertial mass.

In yet another embodiment of the invention and referring to FIG. 7, a fairing 80 may be mounted to and disposed over the inertial mass 50. In the preferred embodiment, the fairing 80 includes an annular segment 84 defining the leading and trailing edge contour of the fairing 80 and a top segment 86 mounting to an upper lip 84$_L$ of the annular segment 84 for defining the upper surface contour of the fairing 80. The annular segment 84 is mounted to the inertial mass 50 along the peripheral upper and lower edges 50$_E$ thereof, and in the described embodiment, a V-shaped bracket 88 is employed along the upper edge 50$_E$ to facilitate the contour of the fairing 80.

In this embodiment of the invention, the fairing 80 constitutes about 20% of the "working mass" of the vibration isolator 20. In the context used herein, the "working mass" is that portion of the total mass of the vibration isolator 20 which functions to oppose vibrations active on the main rotor 12. In this embodiment, the vibration isolator includes about 100 lbs. (45.4 kg.) of working mass wherein the fairing 80 contributes about 42 lbs. (19.0 kg.) thereto, the inertial mass 50 contributes about 50 lbs. (22.7 kg.) and the arcuate spring elements 40 contribute about 8 lbs. (3.6 kg.).

Although the invention has been shown and described with respect to exemplary embodiments thereof, it should be understood by those skilled in the art that other changes, omissions and additions may be made therein and thereto, without departing from the spirit and scope of the present invention. For example, while the exemplary embodiments of the present invention have been described in the context of a rotorcraft, it will be appreciated that the teachings described herein are applicable to any rotating shaft or body wherein it is desired to cancel or reduce vibrations in a plane normal to the rotational axis of the shaft or body. Furthermore, while the described embodiment depicts the inertial mass 50 disposed in combination with a plurality of arcuate spring elements 40, it will be appreciated that any spring means may be used. For example, radially oriented coil springs may be substituted therefor to provide the requisite spring stiffness.

Figure 8:
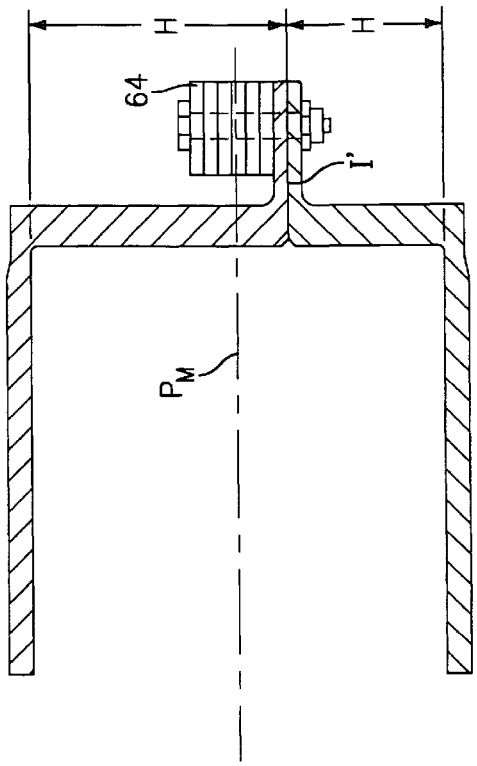
FIG. 8 depicts an alternate embodiment of the inertial mass of the present invention wherein the segments of the inertial mass have unequal web height.

While the Z-shape segments 52 of the inertial mass 50 are depicted as being equal in size and shape, it will be appreciated that variations in web height, leg length, or thickness from one segment to its mating segment 52 may be desired. For example, and referring to FIG. 8, the web height H of each segment 52 may vary so as to produce a mating interface I' which is non-coincident with the mid-plane P$_M$ of the vibration isolator. In this embodiment, it may be advantageous to situate all tuning weights 64 on one side of the mating flange 62 to facilitate addition or removal of such tuning weights 64. Moreover, while the tuning weights 64 are shown as a continuous ring, it is contemplated that the tuning weights may have other configurations such as individual disks at each connecting bolt location.

What is claimed is:

1. An inertial mass (50) for a vibration isolator (20), said vibration isolator (20) having an attachment fitting (22) adapted for rotation about an axis (16), and a spring means (40) adapted for rotation with the attachment fitting (22), the inertial mass (50) adapted for being mounted in combination with the spring means (40) and being characterized by:

a pair of segments (52) each having a generally Z-shaped cross-sectional configuration, each said segment (52) defining a central web (54) adapted for being mounted in combination with the spring means (40), a first leg (56) projecting radially inboard of said central web (54) and integrally formed therewith, said first leg (56) having a radially inner terminal end which is spaced apart from said attachment fitting (22) so as to define a gap therebetween when the inertial mass (50) is attached to the vibration isolator (20), the gap permitting the inertial mass (50) to move radially with respect to the attachment fitting (22), and a second leg (58) projecting radially outboard of said central web (54) and integrally formed therewith, said second legs (58) being adjoined along a mating interface (I).

2. The inertial mass (50) according to claim 1 wherein said mating interface (I) is adapted to be coplanar with a mid-plane (P$_M$) on the vibration isolator (20) that is normal to the rotational axis (16).

3. The inertial mass (50) according to claim 1 wherein each of said first legs (56) defines a circular abutment surface (68) adapted for coacting with an opposing abutment surface (70) of the attachment fitting (22).

4. The inertial mass (50) according to claim 1 wherein said second legs (58), in combination, define a mating flange (62) adapted for mounting at least one tuning weight (64).

5. The inertial mass (50) according to claim 4 wherein each of said first legs (56) defines a circular abutment surface (68) adapted for coacting with an opposing abutment surface (70) of the attachment fitting (22).

6. The inertial mass (50) according to claim 4 wherein said mating interface (I) is adapted to be coplanar with a mid-plane (P$_M$) on the vibration isolator (20) that is normal to the rotational axis (16).

7. The inertial mass (50) according to claim 6 wherein each of said first legs (56) defines a circular abutment surface (68) adapted for coacting with an opposing abutment surface (70) of the attachment fitting (22).

8. A vibration isolator (20) having an attachment fitting (22) adapted for rotation about an axis (16), a spring means (40) adapted for rotation with the attachment fitting (22), and an inertial mass (50) adapted for being mounted in combination with the spring means (40), the vibration isolator being characterized by:

inertial mass (50) including:

a pair of segments (52) each having a generally Z-shaped cross-sectional configuration, each said segment (52)

defining a central web (54) adapted for being mounted in combination with the spring means (40), a first leg (56) projecting radially inboard of said central web (54) and integrally formed therewith, said first leg (56) having a radially inner terminal end which is spaced apart from said attachment fitting (22) so as to define a gap therebetween, the gap permitting the inertial mass (50) to move radially with respect to the attachment fitting (22), and a second leg (58) projecting radially outboard of said central web (54) and integrally formed therewith, said second legs (58) being adjoined along a mating interface (I).

9. The vibration isolator (20) according to claim 8 wherein said vibration isolator (20) defines a mid-plane ($P_M$) normal to the rotational axis (16) and wherein said mating interface (I) is coplanar with said mid-plane ($P_M$).

10. The vibration isolator (20) according to claim 8 wherein said vibration isolator (20) is further characterized by an aerodynamic fairing (80) mounted to and disposed over said inertial mass (50).

11. The vibration isolator (20) according to claim 8 wherein each of said first legs (56) defines a circular abutment surface (68) adapted for coacting with an opposing abutment surface (70) of the attachment fitting (22).

12. The vibration isolator (20) according to claim 11 wherein the attachment fitting (22) defines a circular groove (74) for retaining an elastomer ring (76), said elastomer ring (76) defining said opposing abutment surface (70).

13. The vibration isolator (20) according to claim 8 wherein said vibration isolator (20) includes at least one tuning weight (64) and wherein said second legs (58), in combination, define a mating flange (62) adapted for mounting said at least one tuning weight (64).

14. The vibration isolator (20) according to claim 13 wherein each of said first legs (56) defines a circular abutment surface (68) adapted for coacting with an opposing abutment surface (70) of the attachment fitting (22).

15. The vibration isolator (20) according to claim 14 wherein the attachment fitting (22) defines a circular groove (74) for retaining an elastomer ring (76), said elastomer ring (76) defining said opposing abutment surface (70).

16. The vibration isolator (20) according to claim 12 wherein said vibration isolator (20) defines a mid-plane ($P_M$) normal to the rotational axis (16) and wherein said mating interface (I) is coplanar with said mid-plane ($P_M$).

17. The vibration isolator (20) according to claim 16 wherein each of said first legs (56) defines a circular abutment surface (68) adapted for coacting with an opposing abutment surface (70) of the attachment fitting (22).

18. The vibration isolator (20) according to claim 17 wherein the attachment fitting (22) defines a circular groove (74) for retaining an elastomer ring (76), said elastomer ring (76) defining said opposing abutment surface (70).

* * * * *